United States Patent
Melendez et al.

(10) Patent No.: US 12,212,716 B2
(45) Date of Patent: Jan. 28, 2025

(54) SYSTEMS AND METHODS FOR AUTHENTICATING CALLS FOR A CALL CENTER

(71) Applicant: Capital One Services, LLC, McLean, VA (US)

(72) Inventors: Jenny Melendez, Falls Church, VA (US); Samuel Rapowitz, Roswell, GA (US); Daniel E. Miller, Brooklyn, NY (US); Tyler Maiman, Melville, NY (US); Viraj Chaudhary, Katy, TX (US); Joshua Edwards, Philadelphia, PA (US); David Septimus, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 359 days.

(21) Appl. No.: 17/724,428

(22) Filed: Apr. 19, 2022

(65) Prior Publication Data

US 2023/0336662 A1    Oct. 19, 2023

(51) Int. Cl.
*H04M 3/51* (2006.01)
*H04M 3/42* (2006.01)

(52) U.S. Cl.
CPC ..... *H04M 3/5183* (2013.01); *H04M 3/42068* (2013.01); *H04M 2203/6054* (2013.01); *H04M 2203/6063* (2013.01); *H04M 2203/6081* (2013.01)

(58) Field of Classification Search
CPC ......... H04M 3/5183; H04M 3/42068; H04M 2203/6054; H04M 2203/6063; H04M 2203/6081; H04M 2207/185
See application file for complete search history.

(56) References Cited

U.S. PATENT DOCUMENTS

| | | | |
|---|---|---|---|
| 6,324,271 B1 * | 11/2001 | Sawyer | H04M 1/67 |
| | | | 379/142.04 |
| 9,501,776 B2 | 11/2016 | Martin | |
| 9,680,942 B2 * | 6/2017 | Dimmick | H04L 67/52 |
| 9,961,194 B1 | 5/2018 | Wiechman et al. | |
| 10,117,098 B1 | 10/2018 | Naguthanawala et al. | |

(Continued)

FOREIGN PATENT DOCUMENTS

KR    2010079325 A    7/2010

*Primary Examiner* — Siu M Lee
(74) *Attorney, Agent, or Firm* — TROUTMAN PEPPER HAMILTON SANDERS LLP; Christopher J. Forstner; John A. Morrissett

(57) ABSTRACT

Disclosed embodiments may include a method for authenticating calls for a call center where the user can authenticate before or after starting a call to a call center using an application on a user device. The system determines what level of authentication is necessary depending on the task the user wants to accomplish during the call. The system may direct the user to provide credentials, such as a username and password, for some tasks. Other tasks may require the user to verify their financial card by taking a photo of their financial card or tapping their financial card to their device and allow the device to interact with the financial card using NFC technology. Once appropriately authenticated, the system then allows the user to make a call to the call center and also sends a signal to the call center that the user has been previously authenticated.

21 Claims, 6 Drawing Sheets

(56) References Cited

U.S. PATENT DOCUMENTS

| | | |
|---|---|---|
| 10,154,134 B1 | 12/2018 | Wiechman et al. |
| 10,506,426 B1 * | 12/2019 | Rule .................. H04L 63/0853 |
| 10,721,353 B1 | 7/2020 | Weichman et al. |
| 11,140,261 B1 | 10/2021 | Wiechman et al. |
| 11,165,586 B1 | 11/2021 | Rule et al. |
| 11,533,397 B1 * | 12/2022 | Hansen ............... H04L 12/1859 |

* cited by examiner

SYSTEMS AND METHODS FOR AUTHENTICATING CALLS FOR A CALL CENTER

The disclosed technology relates to systems and methods for authenticating calls for a call center. Specifically, this disclosed technology relates to allowing a user to authenticate using a mobile device application instead of or in addition to authenticating by answering personal questions over the phone.

BACKGROUND

People call businesses to ask account related questions associated with these businesses. For example, a person may call to add a new person onto their account. Such a request may require them to verify their identity. This is important because many changes to accounts can be a major security risk if the person changing the account is not the person that they say they are. As a result, many companies require callers to prove their identity by answering questions before they are allowed to change any critical account information.

Traditional systems and methods for authenticating calls for a call center typically require customers to answer a number of questions correctly over the phone. In many cases, the customer service representative has to ask the caller to answer the questions (typical questions can be invasive and request the caller to provide, for example, a social security number, their mother's maiden name, first town they lived in, etc.). This can make some callers nervous because they do not want to state sensitive answers to a customer service representative. Other callers may not be in a private area when calling and do not want to state the answers out loud. This process can also be cumbersome and take up a significant amount of time as it can sometimes be difficult to hear combinations of letters and numbers over the phone.

Accordingly, there is a need for improved systems and methods for authenticating calls for a call center. Embodiments of the present disclosure are directed to this and other considerations.

SUMMARY

Disclosed embodiments may include a system for authenticating calls for a call center. The system may include one or more processors, and memory in communication with the one or more processors and storing instructions that, when executed by the one or more processors, are configured to cause the system to authenticate calls to a call center. The system may include receiving, from a user device (e.g., user device 402), authentication credentials (at, e.g., authentication management system 320). The system may also include receiving a task request from the user. For instance, the system may include determining a level of authentication required based on the task request. The system may also include determining whether a current level of authentication is equal to or greater than the level of authentication required. The system may, in response to determining that the level of authentication required is not equal to or greater than the current level of authentication, iteratively perform the following steps until the system determines the current level of authentication is equal to or greater than the level of authentication required including: transmitting, to the user device, a first prompt for receiving additional authentication from the user, receiving, via the user device, an additional authentication from the user, and determining, using the additional authentication, whether the current level of authentication is greater than or equal to the level of authentication required. The system may, in response to determining the current level of authentication is equal to or greater than the level of authentication required, include transmitting, to the user device, a first message to call the call center as an authenticated user and transmitting, to a call center, a second message that the user is authenticated.

Disclosed embodiments may include a system for authenticating calls for a call center. The system may include one or more processors, and memory in communication with the one or more processors and storing instructions that, when executed by the one or more processors, are configured to cause the system to authenticate calls to a call center. The system may include receiving, from a user device (e.g., user device 402), authentication credentials (at e.g., authentication management system 320). The system may also include transmitting, to the user device, a prompt for receiving card authentication from the user. For instance, the system may include receiving, via the user device, card authentication from the user. The system may also include determining, using the authentication credentials and the card authentication, an authentication status of the user. The system may include transmitting a first prompt to the user device to start a call to a call center, from the user device, using an external calling application. Furthermore, the system may include verifying, using call history on the user device, that a prior call was not previously placed to the call center. Finally, the system may, in response to verifying that the prior call was not previously placed, include transmitting, to the call center, the authentication status of the user.

Disclosed embodiments may include a system for authenticating calls for a call center. The system may include one or more processors, and memory in communication with the one or more processors and storing instructions that, when executed by the one or more processors, are configured to cause the system to authenticate calls to a call center. The system may include receiving, from a call center, an indication that a call from the user to the call center has started (at e.g., authentication management system 320). For instance, the system may include determining a level of authentication required based on the indication. The system may include transmitting a first message, to a user device, to authenticate using a user device application. Additionally, the system may also include receiving, from the user device, authentication credentials. Furthermore, the system may include determining whether a current level of authentication is equal to or greater than a level of authentication required. The system may also, in response to determining that the level of authentication required is not equal to or greater than the current level of authentication, iteratively perform the following steps until the system determines the current level of authentication is equal to or greater than the level of authentication required including: transmitting, to the user device, a prompt for receiving additional authentication from the user, receiving, via the user device, an additional authentication from the user, and determining, using the additional authentication, whether the current level of authentication is greater than or equal to the level of authentication required. Finally, in response to determining the current level of authentication is equal to or greater than the level of authentication required the system may include transmitting, to the call center, a second message that the user is authenticated.

Disclosed embodiments may include a system for authenticating calls for a call center. The system may include one or more processors, and memory in communication with the one or more processors and storing instructions that, when executed by the one or more processors, are configured to cause the system to authenticate calls to a call center. The system may include receiving, from the user, authentication credentials. The system may also include receiving a task request from the user (at e.g., authentication management system 320). For instance, the system may also include determining a level of authentication required based on the task request. The system may also include determining whether a current level of authentication is equal to or greater than the level of authentication required. The system may, in response to determining that the level of authentication required is not equal to or greater than the current level of authentication, iteratively perform the following steps until the system determines the current level of authentication is equal to or greater than the level of authentication required including: displaying, on a graphical user interface, a first prompt for receiving additional authentication from the user, receiving an additional authentication from the user, and determining, using the additional authentication, whether the current level of authentication is greater than or equal to the level of authentication required. The system may, in response to determining the current level of authentication is equal to or greater than the level of authentication required include displaying, on the graphical user interface, a second prompt to call the call center as an authenticated user and transmitting, to a call center, a first message that the user is authenticated.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure related to systems and methods for authenticating calls for a call center. More particularly, the disclosed technology relates to a system that allows users to authenticate before starting or after starting a phone call using a mobile application. The systems and methods described herein utilize, in some instances, graphical user interfaces, which are necessarily rooted in computers and technology. Graphical user interfaces (GUIs) are a computer technology that allows for user interaction with computers through touch, pointing devices, or other means. The present disclosure details a mobile application that allows a user to self-authenticate before or after starting a phone call to a customer service call center. This, in some examples, may involve a mobile device with a dynamically changing GUI that responds to the user's input. For example, the user may input a choice of the reason for the phone call. Based on that choice, the GUI may change to ask for different levels of authentication. Using a GUI in this way may allow the system to greatly increase the speed and security of an authenticated call to a call center. This is a clear advantage and improvement over prior technologies that force the user to authenticate with the call center agent because it can make the user nervous or concerned about security. The present disclosure solves this problem by taking the call center agent out of the picture and allows the user to authenticate easily, securely, and quickly using an application on their phone. Furthermore, examples of the present disclosure may also improve the speed with which people can authenticate for a phone call, which greatly increases call center productivity and decreases call center wait times. Overall, the systems and methods disclosed have significant practical applications in the call center customer service fields because of the noteworthy improvements of using an app to authenticate users. This methodology is important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
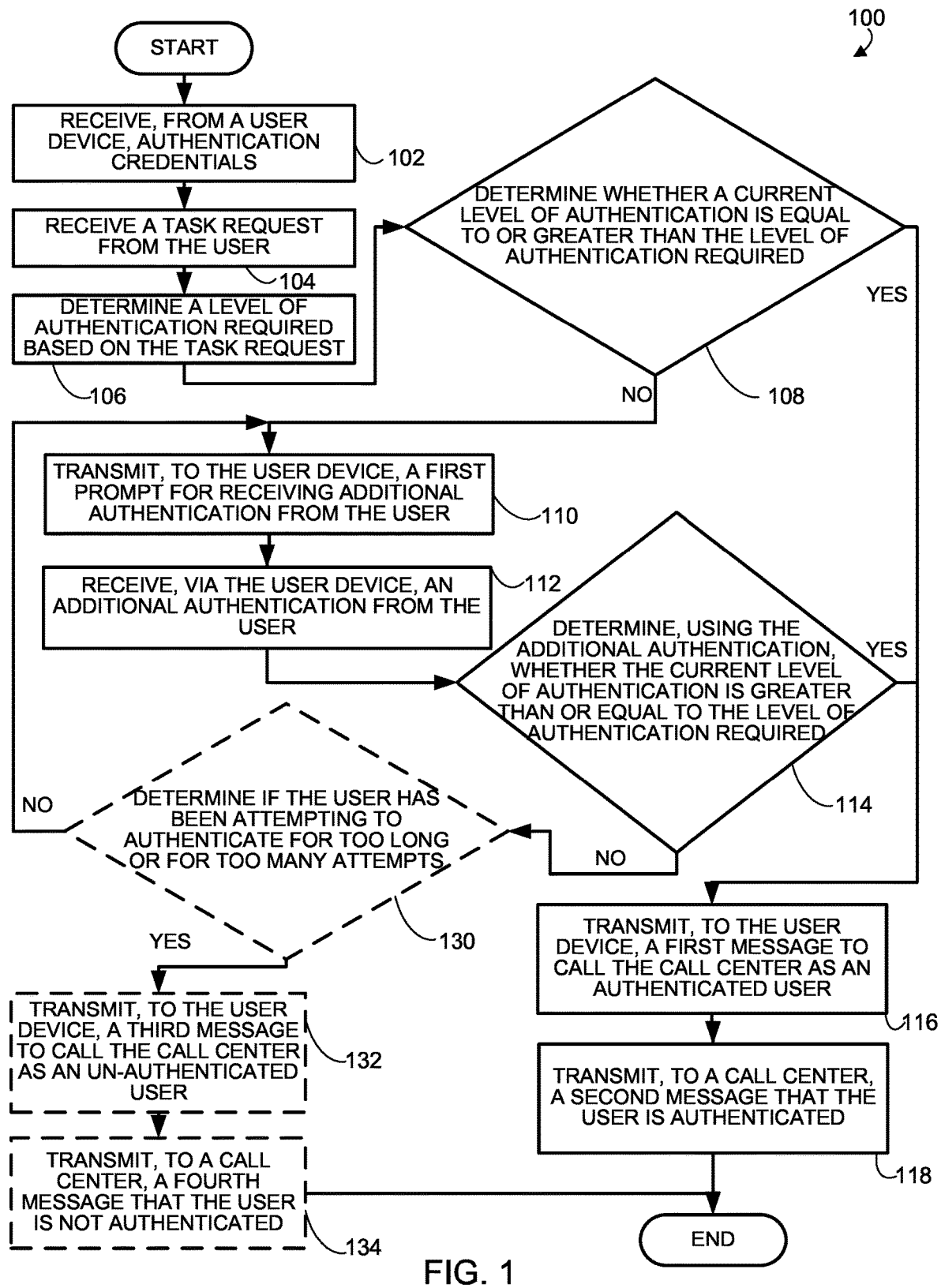
FIG. 1 is a flow diagram illustrating an exemplary method for authenticating calls for a call center in accordance with certain embodiments of the disclosed technology.

FIG. 1 is a flow diagram illustrating an exemplary method 100 for authenticating calls for a call center, in accordance with certain embodiments of the disclosed technology. The steps of method 100 may be performed by one or more components of the system 400 (e.g., authentication management system 320 or web server 410 of user authentication system 408 or user device 402), as described in more detail with respect to FIGS. 3 and 4.

In block 102, the authentication management system 320 may receive authentication credentials from a user device 402. The user device 402 may be a smart phone, computer, or any device capable of accessing the internet. The authentication credentials may be a username and password used to login to an application or website. Alternative methods of authentication credentials may be used, such as via a fingerprint scanner or face identification using the user device's 402 camera.

In block 104, the authentication management system 320 may receive a task request from the user. The task request indicates what the user would like to do on the call. For example, if a user would like to call to check their account balance, they would choose the task request button for "account balance." Alternatively, if a user would like to add another user to their account, they would choose the task request button for "add account user." There may be a variety of task request buttons for a variety of different task requests. On the user device 402, the task request may be shown as a drop-down menu or a button selection. There may be options for a user to choose more than one task request. This would allow the user to accomplish multiple tasks on one call and become authenticated at the level required for the most secure task.

In block 106, the authentication management system 320 may determine a level of authentication required based on the task request. Different task requests may require different levels of authentication. Certain task requests may be associated with a particular level of authentication. In the example above, where the user is calling to check their account balance, the user only needs minimal levels of authentication. The authentication management system 320 would understand that because the user chose that they would like to check their account balance, the user only needs to provide their authentication credentials (e.g., single factor authentication). This may require the authentication management system 320 checking the levels of authentication with database 360. Conversely, in the other example above, where the user would like to add another user to their account, the authentication management system 320 would understand that the user would need to provide their authentication credentials and then additional levels of authentication. Task requests may be associated with certain levels of authentication (e.g., multifactor authentication). The levels of authentication may be directly related to the amount of security or identification needed to complete a task. For example, checking an account balance may require one level of authentication. Other tasks may require two, three, or more levels of authentication. A machine learning model, for example a neural network, may be used to classify certain task requests with a particular level of authentication for a particular user.

In block 108, the authentication management system 320 may determine whether the current level of authentication is equal to or greater than the level of authentication required. The authentication management system 320 may decide, based on the task request, if more authentication is required. If more authentication is required, then authentication management system 320 may ask the user to provide additional information following the path of blocks 110, 112, and 114. For example, if the user is trying to add another user to their account, the authentication management system 320 determines that the user currently has level 1 authentication (from the authentication credentials) and needs level 2 authentication to make a user change to their account, then authentication management system 320 would send the user down the path of blocks 110, 112, and 114.

The action of asking the user for additional information may repeat until the level of authentication is greater than the level of authentication required for the task request that the user has selected in conjunction with block 114. Alternatively, after several attempts to receive additional authentication from the user or if an excess amount of time has passed, the system may fail to authenticate the user and ask the user to prepare additional items of authentication to use during the phone call (following along the path including blocks 130, 132, and 134).

If more authentication is not required, then the authentication management system 320 may move to block 116. For example, as above, if the user is trying to check their account balance, they only require level 1 authentication, which is supplied by authentication credentials. Since no further authentication is required, authentication management system 320 may determine that the user does not need to provide additional authentication and can proceed directly to block 116.

In block 110, the authentication management system 320 may transmit a prompt to the user device 402 to receive additional authentication from the user. The prompt may be plain text, a diagram, or a pop-up window. Additional authentication may include card authentication using a credit or debit card or some other type of appropriate authentication. The prompt may include a button to go to another part of the application to obtain appropriate authentication. The prompt may include an option to authenticate using card authentication by taking a picture of the user's credit, debit, or financial card. In this case, the user may be prompted to take a picture of the front and/or back of one or more of their financial cards. Alternatively, the prompt may include an option to authenticate a card using NFC authentication. In this case, the user may be prompted to tap one or more of their financial cards to their user device 402. This may be dependent on the user device 402 having an NFC interface system.

In block 112, the authentication management system 320 may receive additional authentication from the user via the user device 402. If the additional authentication is card authentication, then authentication management system 320 may receive images of the user's card. The images of the user's card may come from a camera on or associated with the user device 402. Authentication management system 320 may then process the image of the card using optical character recognition (OCR) in order to determine the numbers, letters, or symbols on the card. After determining the alphanumeric digits on the card, authentication management system 320 may authenticate the card by comparing the card number with known values associated with the user's profile found in the user device 402, database 360, or database 416. Alternatively, authentication management system 320 may authenticate the card by using check digits (for example, using the Luhn algorithm). If authentication management system 320 determines that the card is authenticated, then it may increase the current level of authentication accordingly.

Furthermore, card authentication can also be completed using near-field communication (NFC) card verification. This involves the user tapping their financial card on or placing their financial card near their user device 402 so that the NFC chip is able to communicate with the user device 402. This may be completed by having the user tap their financial card to the mobile device. As a result, the user device 402 may communicate using NFC with the financial card and can verify the card's authenticity against the user's profile found on mobile device 402, in database 360, or database 416. If authentication management system 320 determines that the card is authenticated, then it may increase the current level of authentication accordingly.

In block 114, the authentication management system 320 may determine, while considering the additional authentication provided by the user, whether the current level of authentication is greater than or equal to the level of authentication required. For example, if the user was attempting to do something requiring a level two authentication, and originally had a current level of authentication of on (because they provided their authentication credentials), and then provided card authentication, which increased their authentication to level two, the user would be permitted by authentication management system 320 to travel to block 116. Alternatively, if the user attempted to use NFC card authentication and did not have an NFC card, the authentication would fail, and the user's current level of authentication would not increase from one to two. Therefore, authentication management system 320 would proceed to block 110 (and optionally through block 130) to attempt to receive additional authentication for a second time. This loop may occur repeatedly until the user's level of authentication is sufficient for the task request that the user has selected. If the user takes too long to provide additional information or fails to authenticate after a number of tries, the user may not be authenticated and the authentication management system 320 may follow the path of block 130 to 132 and 134.

In block 116, the authentication management system 320 may transmit a first message to the user device 402 to instruct the user to call the call center. This message may include the phone number of the call center. The message may also include a prompt to start a voice over IP (VOIP call) from an application on the user device 402. Alternatively, the message may also include a prompt to make a call using a calling feature of the user device 402 using an external application (for example, using the calling application of the user device 402).

In block 118, the authentication management system 320 may transmit a second message to a call center that the user has been authenticated. This may occur at the same time the user pushes the button to call the call center in block 116. Provided that the current level of authentication is sufficient for the task request, as determined in blocks 108 or 114, a message is transmitted to the call center that the user is sufficiently authenticated for the task request. This message may include the task request the user selected, the user's current level of authentication, information about the methods of authentication, how many attempts it took the user to authenticate, the time it took to authenticate the user, the user's profile or account ID, the phone number the user is calling from, and other metrics about the user's pre-authentication. The message may use a backend API service and may be a token. After the user authenticates, the authentication message may be active at the call center for a limited amount of time. If the user does not call the call center within the time limitation, the user may have to reauthenticate when the user calls the call center. Additionally, if the user is unable to connect with a call center on a first calling attempt, then the authentication may remain active provided that the second calling attempt is made within a predetermined threshold amount of time after the first calling attempt. When the user calls the call center, the call center agent may know that the user has been previously authenticated. The call center agent may be able to see more information about the user's authentication attempts such as the task request the user selected, the user's current level of authentication, information about the methods of authentication, how many attempts it took the user to authenticate, the time it took to authenticate the user, the user's profile or account ID, the phone number the user is calling from, and other metrics about the user's pre-authentication.

In optional block 130, authentication management system 320 may determine if the user is taking excess time to provide the authentication and/or the user has taken too many attempts to authenticate. This serves as an optional security feature to ask users having attempted to use application authentication to revert to authentication over the phone.

In optional block 132, authentication management system 360 may transmit a message to the user device 402 that the user is not authenticated but can still contact the call center. The user may be prompted that they may need to provide additional items for authentication while on the phone call. The user may be prompted on which items they need to provide for authentication. Authentication management system 320 may display the items of additional authentication the user needs to provide. This may be useful if the user has already provided authentication credentials (and thereby achieved level 1 of authentication). Therefore, on the call, the user only has to supply authentication to reach level 2, rather than supply authentication for levels 1 and 2. Furthermore, this message may include the phone number of the call center. The message may also include a prompt to start a voice over IP (VOIP call) from an application on the user device 402. Alternatively, the message may also include a prompt to make a call using a calling feature of the user device 402 using an external application (for example, using the calling application of a cell phone).

In optional block 134, authentication management system 360 may transmit a message to the call center that the user is not authenticated. The authentication management system 360 may also transmit that the level of authentication is lower than required. This message may include the task request the user selected, the user's current level of authentication, information about the methods of authentication, how many attempts the user took to authenticate, the time it took to authenticate the user, the user's profile, the phone number the user is calling from, and other metrics about the user's pre-authentication.

Figure 2:
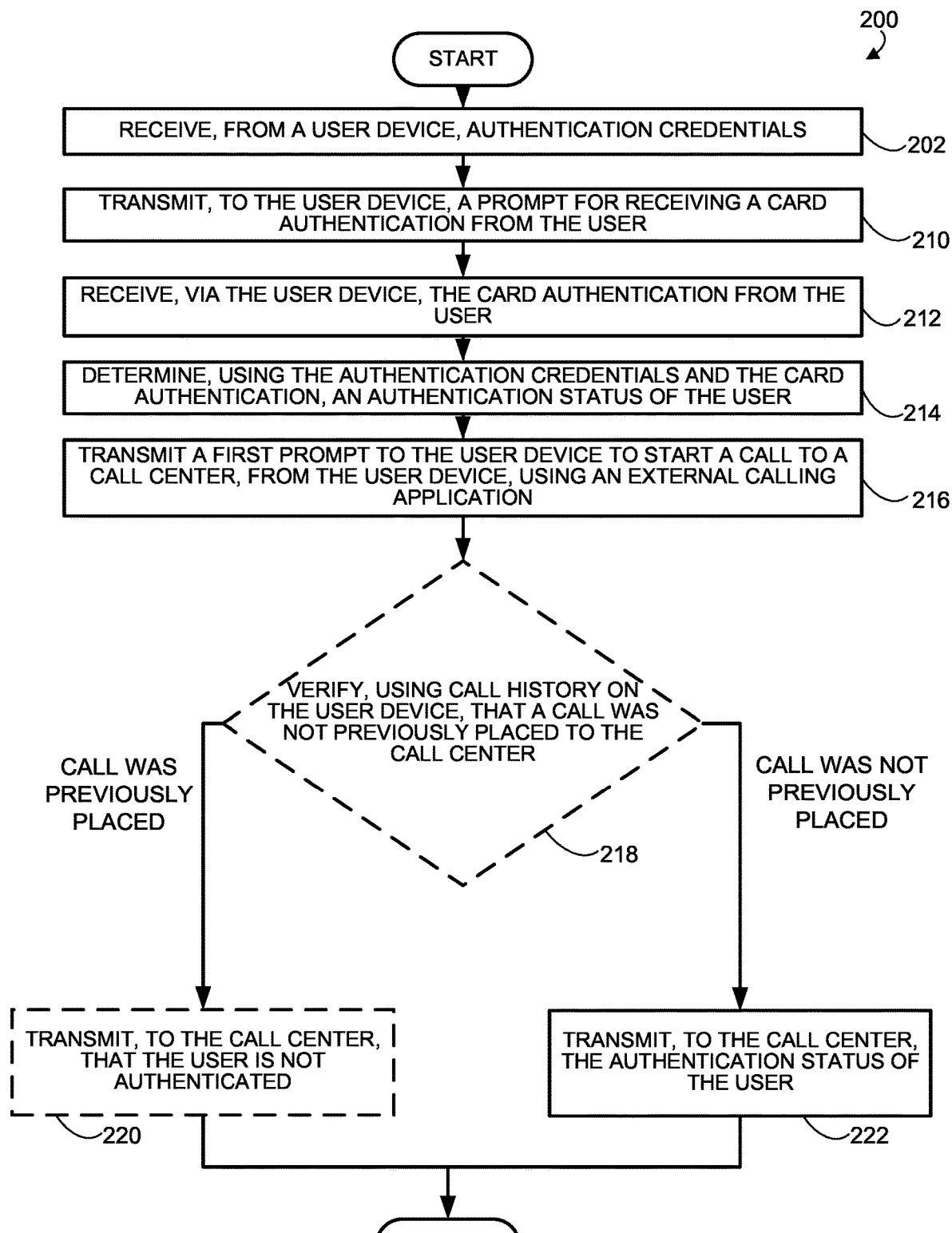
FIG. 2 is a flow diagram illustrating an exemplary method for authenticating calls for a call center in accordance with certain embodiments of the disclosed technology.

FIG. 2 is a flow diagram illustrating an exemplary method 100 for authenticating calls for a call center, in accordance with certain embodiments of the disclosed technology. The steps of method 200 may be performed by one or more components of the system 400 (e.g., authentication management system 320 or web server 410 of user authentication system 408 or user device 402), as described in more detail with respect to FIGS. 3 and 4.

Method 200 of FIG. 2 is similar to method 100 of FIG. 1, except that method 200 may not include blocks 104, 106, 108, 130, 132, and 134 of method 100. The descriptions of blocks 202, 210, and 212 in method 200 are similar to the respective descriptions of blocks 102, 110, and 112 of method 100 and are not repeated herein for brevity. However, blocks 214, 216, and 218 are different from blocks 114, 116, and 118 and are described below. Additional blocks 220 and 222 are also described below.

In block 214, the authentication management system 320 may determine an authentication status of the user using the authentication credentials and the card authentication. Card authentication may be similar to the additional authentication as described in block 110. The authentication status may be similar to the current level of authentication as described in method 100. The authentication status may be a true/false identifier or be an alphanumeric indication of the current level of authentication. The authentication status may include metric data.

In block 216, the authentication management system 320 may transmit a prompt to the user device 402 to instruct the user to call the call center using an external calling application. For example, a mobile application on a user device 402 may display a link for the user to use the calling application of their user device 402 (if the user device 402 had a typical phone connection, i.e., a cell phone).

In optional block 218, the authentication management system 320 may verify that a call was not previously placed to the call center in a predetermined amount of time by analyzing the call history on the device. This block is aimed at checking that the user did not authenticate via the app and previously call the call center. This is a safeguard so that after the user completes the call, a fraudulent user cannot attempt to call the call center a second time and act as the authenticated user. The time between the first and second call to the call center may be a predetermined threshold time. The predetermined threshold time may vary based on indications from the database 360 that the first call was disconnected unintentionally.

In optional block 220, the authentication management system 320 may transmit that the user is not authenticated to the call center. In the event that a call was previously placed to the call center, the authentication management system 320 may send a message to the call center that the user is not authenticated. This message may include a possible fraud flag. This message may include the authentication status of the user prior to the prior call verification (block 218). This reference may supersede the authentication status of the user.

In block 222, the authentication management system 320 may transmit the authentication status of the user to the call center. When the user call is routed to a call center agent, the agent will be able to see the authentication status of the user, and therefore will be able to immediately start the task the user requests, provided the authentication status is adequate for the task. This increases the agent's efficiency and decreases the amount of time the user has to wait on the phone.

Figure 3:
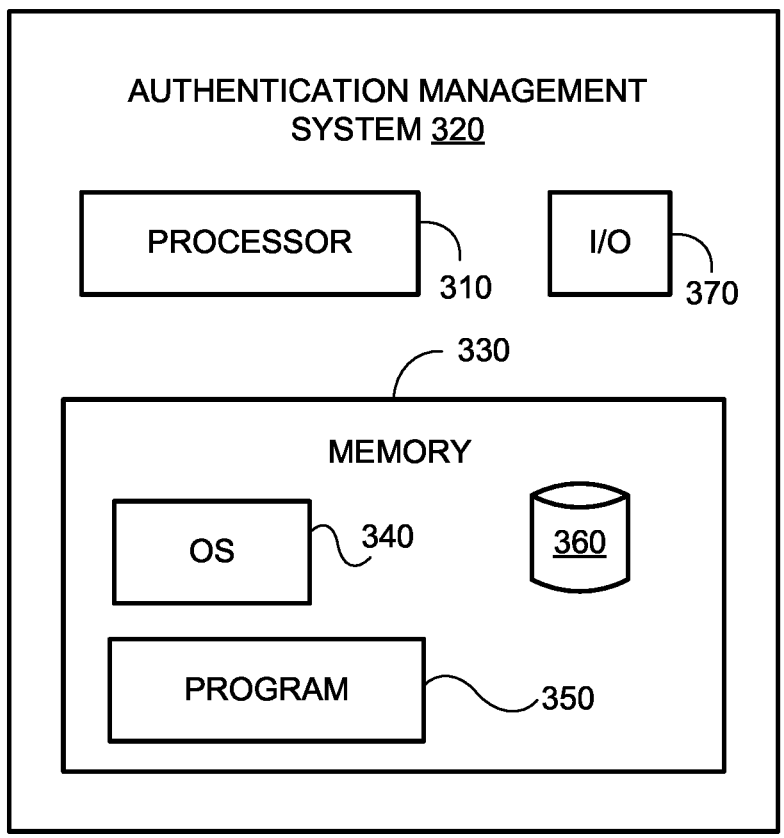
FIG. 3 is block diagram of an example authentication management system used to authenticate calls to a call center, according to an example implementation of the disclosed technology.
Figure 4:
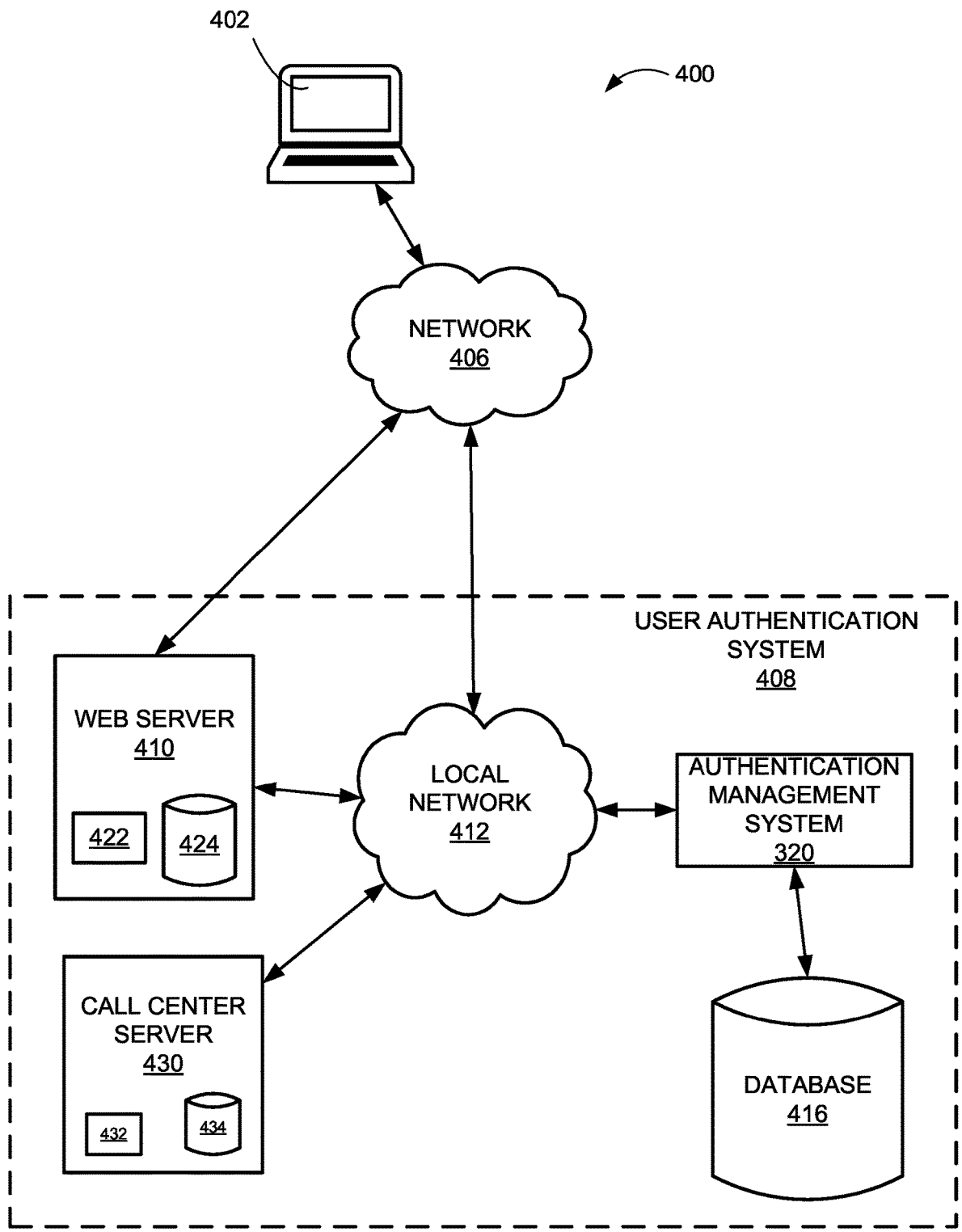
FIG. 4 is block diagram of an example system that may be used to authenticate users, according to an example implementation of the disclosed technology.

FIG. 3 is a block diagram of an example authentication management system 320 used to authenticate calls for a call center according to an example implementation of the disclosed technology. According to some embodiments, the user device 402 and web server 410, as depicted in FIG. 4 and described below, may have a similar structure and components that are similar to those described with respect to authentication management system 320 shown in FIG. 3. As shown, the authentication management system 320 may include a processor 310, an input/output (I/O) device 370, a memory 330 containing an operating system (OS) 340 and a program 350. In certain example implementations, the authentication management system 320 may be a single server or may be configured as a distributed computer system including multiple servers or computers that interoperate to perform one or more of the processes and functionalities associated with the disclosed embodiments. In some embodiments authentication management system 320 may be one or more servers from a serverless or scaling server system. In some embodiments, the authentication management system 320 may further include a peripheral interface, a transceiver, a mobile network interface in communication with the processor 310, a bus configured to facilitate communication between the various components of the authentication management system 320, and a power source configured to power one or more components of the authentication management system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the authentication management system 320 may include one or more storage devices configured to store information used by the processor 310 (or other components) to perform certain functions related to the disclosed embodiments. In one example, the authentication management system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The authentication management system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the authentication management system 320 may include the memory 330 that may include one or more programs 350 to perform one or more functions of the disclosed embodiments. For example, in some embodiments, the authentication management system 320 may additionally manage dialogue and/or other interactions with the customer via a program 350.

The processor 310 may execute one or more programs 350 located remotely from the authentication management system 320. For example, the authentication management system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a authentication management system database 360 for storing related data to enable the authentication management system 320 to perform one or more of the processes and functionalities associated with the disclosed embodiments.

The authentication management system database 360 may include stored data relating to status data (e.g., average session duration data, location data, idle time between sessions, and/or average idle time between sessions) and historical status data. According to some embodiments, the functions provided by the authentication management system database 360 may also be provided by a database that is external to the authentication management system 320, such as the database 416 as shown in FIG. 4.

The authentication management system 320 may also be communicatively connected to one or more memory devices (e.g., databases) locally or through a network. The remote memory devices may be configured to store information and may be accessed and/or managed by the authentication management system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The authentication management system 320 may also include one or more I/O devices 370 that may comprise one or more interfaces for receiving signals or input from devices and providing signals or output to one or more devices that allow data to be received and/or transmitted by the authentication management system 320. For example, the authentication management system 320 may include interface components, which may provide interfaces to one or more input devices, such as one or more keyboards, mouse devices, touch screens, track pads, trackballs, scroll wheels, digital cameras, microphones, sensors, and the like, that enable the authentication management system 320 to receive data from a user (such as, for example, via the user device 402).

In examples of the disclosed technology, the authentication management system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the authentication management system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the authentication management system 320 may include a greater or lesser number of components than those illustrated.

FIG. 4 is a block diagram of an example system that may be used to interact with user authentication system 408, according to an example implementation of the disclosed technology. The components and arrangements shown in FIG. 4 are not intended to limit the disclosed embodiments as the components used to implement the disclosed processes and features may vary. As shown, user authentication system 408 may interact with a user device 402 via a network 406. In certain example implementations, the user authentication system 408 may include a local network 412, an authentication management system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the user authentication system 408. In some embodiments, the user device 402 may include or incorporate electronic communication devices for hearing or vision impaired users. The user device 402 may have a similar structure to authentication management system 320 in FIG. 3 but may include additional components or exclude one or more of the components shown.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the user authentication system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images or a GUI, one or more processors, and a memory in communication with the one or more processors.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The user authentication system 408 may be associated with and optionally controlled by one or more entities such as a business, corporation, individual, partnership, or any other entity that provides one or more of goods, services, and consultations to individuals such as customers. In some embodiments, the user authentication system 408 may be controlled by a third party on behalf of another business, corporation, individual, or partnership. The user authentication system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the authentication management system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the user authentication system 408 to interact with one another and to connect to the network 406 for interacting with components in the system 400 environment. In some embodiments, the local network 412 may include an interface for communicating with or linking to the network 406. In other embodiments, certain components of the user authentication system 408 may communicate via the network 406, without a separate local network 406.

The user authentication system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access user authentication system 408 using the cloud computing environment. User device 402 may be able to access user authentication system 408 using specialized software. The cloud computing environment may eliminate the need to install specialized software on user device 402.

In accordance with certain example implementations of the disclosed technology, the user authentication system 408 may include one or more computer systems configured to compile data from a plurality of sources the authentication management system 320, web server 410, and/or the database 416. The authentication management system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

With continued reference to FIG. 4, the call center server 430 may include a computer system configured to receive, process, and route telephone calls and other electronic communications between a customer or user operating a user device 402 and the authentication management system 320. The call center server 430 may have one or more processors 432 and one or more call center databases 434, which may be any suitable repository of call center data. Information stored in the call center server 430 may be accessed (e.g., retrieved, updated, and added to) via the local network 412 (and/or network 406) by one or more devices of the system 400. In some embodiments, the call center server processor 432 may be used to implement an interactive voice response (IVR) system that interacts with the user over the phone or via a voice/audio call portion of an associated mobile application on the user device 402.

Although the preceding description describes various functions of a user device 402, a web server 410, an authentication management system 320, a database 416, a call center server 430, and agent device 440 in some embodiments, some or all of these functions may be carried out by a single computing device.

Figure 5:
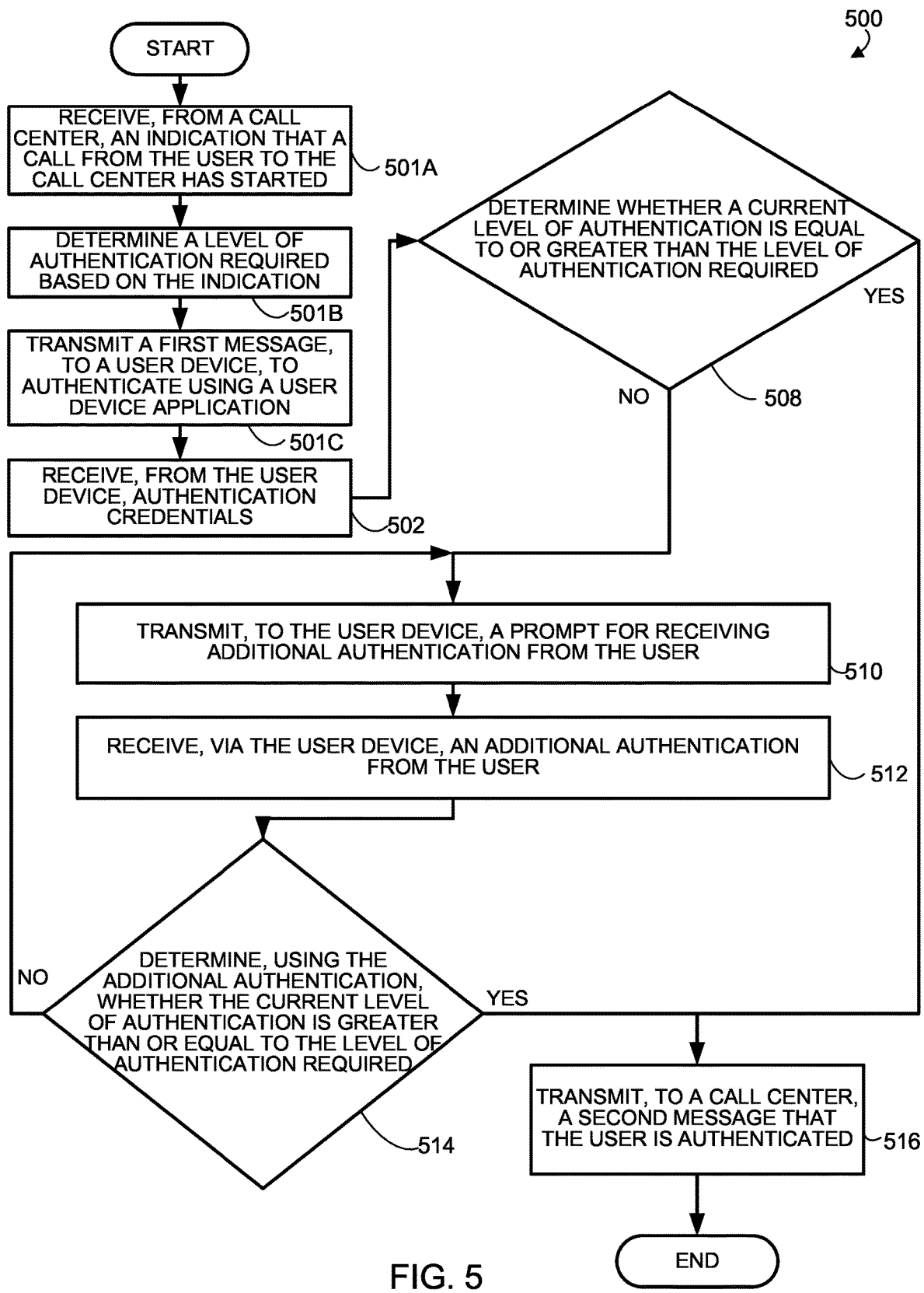
FIG. 5 is a flow diagram illustrating an exemplary method for authenticating calls for a call center in accordance with certain embodiments of the disclosed technology.

Method 500 of FIG. 5 is similar to method 100 of FIG. 1, except that method 500 may not include blocks 104, 106, or 118 of method 100. In FIG. 1, the user call to the call center begins after using application authentication. In FIG. 5, the user call begins before using application authentication. The descriptions of blocks 502, 508, 510, 512, 514, and 516 in method 500 are similar to the respective descriptions of blocks 102, 108, 110, 112, 114, and 116 of method 100 and are not repeated herein for brevity. Additional blocks 501A, 501B, and 501C are described below. Optional blocks 130, 132, and 134 of FIG. 1 may also apply to FIG. 5 but are not shown.

In block 501A, the authentication management system 320 may receive an indication from a call center that a call from the user has started. For example, the user may call the call center to change his address. The call center agent or automated call center system, after understanding the user's purpose in calling, may ask the user if they would like to use application authentication instead of typical authentication over the phone. If the user answers affirmatively, then the call center server 430 will send an indication to the authentication management system 320 containing the user's name, profile information, and the user's reason for calling. The user's reason for calling may be similar to a task request and may contain other metrics. This step is analogous to step 104 of FIG. 1.

In block 501B, the authentication management system 320 may determine a level of authentication required based on the indication from the call center. Authentication management system 320 may analyze the indication to determine the level of authentication that the customer needs. The level of authentication required may vary based on the indication. If the indication suggests the user wants to accomplish more than one task, the level of authentication required may be the highest level of authentication required to complete either of the tasks. This step is analogous to step 106 of FIG. 1.

In block 501C, the authentication management system 320 may transmit a first message to a user device 402 to authenticate using a user device application. This may in the form of a text message, a pop-up notification, an email, or any form of signal that gets the user's attention. When the user views the notification, it provides the user a link or button to open up an application on their user device 402. The application will then allow the user to log in using their username and password or other appropriate means and continue to block 502.

Figure 6:
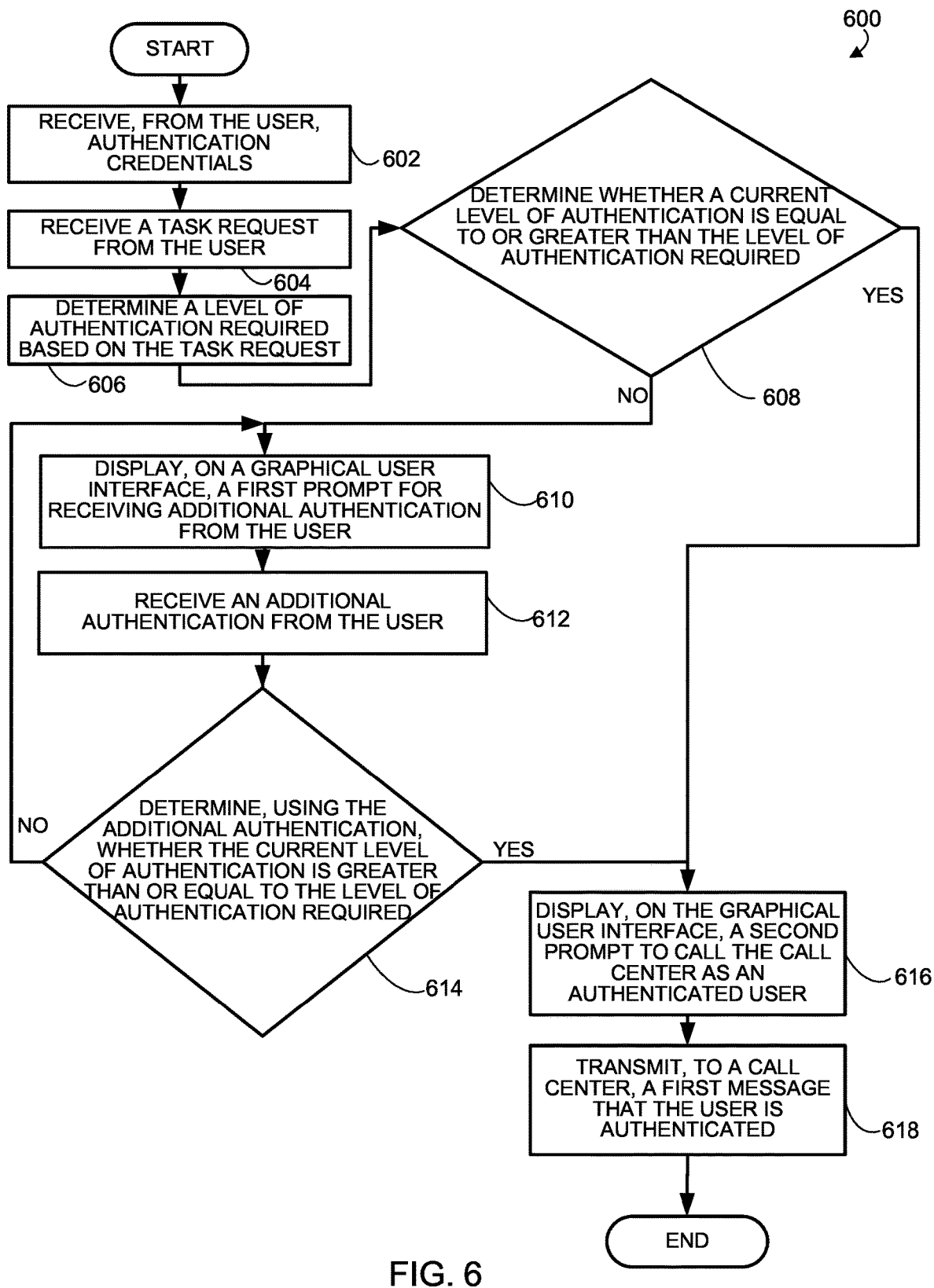
FIG. 6 is a flow diagram illustrating an exemplary method for authenticating calls for a call center in accordance with certain embodiments of the disclosed technology.

Method 600 of FIG. 6 is similar to method 100 of FIG. 1. The descriptions of blocks 602, 604, 606, 608, 612, 614, and 618 in method 200 are similar to the respective descriptions of blocks 102, 104, 106, 108, 112, 114, and 118 of method 100 and are not repeated herein for brevity. Block 610 and 616 are different from block 110 and 116 and are described below. In FIG. 1, the steps are completed using a server for processing. In FIG. 6, the steps are completed using a user device 402. Therefore, any references in FIG. 1 to the "user device" in the descriptions of the blocks for FIG. 1 should be interpreted in reference to FIG. 6 as to/from "the user." Optional blocks 130, 132, and 134 of FIG. 1 may also apply to FIG. 6, but are not shown.

In block 610, the user device 402 may display a prompt on a GUI to elicit additional authentication from the user. The prompt may be plain text, a diagram, or a pop-up window. The prompt may be interactive. Additional authentication may include card authentication using a credit or debit card or some other type of appropriate authentication. The prompt may include a button to go to another part of the application to obtain appropriate authentication. The prompt may include an option to authenticate using card authentication by taking a picture of the user's credit, debit, or financial card. In this case, the user may be prompted to take a picture of the front and/or back of one or more of their financial cards. Alternatively, the prompt may include an option to authenticate a card using NFC authentication.

In block 616, the user device 402 may display a message instructing the user to call the call center using a GUI. This message may include the phone number of the call center. The message may also include a prompt to start a voice over IP (VOIP call) from an application on the user device 402. Alternatively, the message may also include a prompt to make a call using a calling feature of the user device 402 using an external application (for example, using the calling application of the user device 402).

Example Use Case

The following example use case describes an example of a typical user flow pattern. This section is intended solely for explanatory purposes and not in limitation.

In one example, a user is looking to check his account balance and increase his credit card limit. The user decides to pre-authenticate using the mobile application on his smartphone. He logs into the application using his username and password on his user device 402, which transmits associated login credentials to the authentication management system 320 (block 102). He then selects from a menu that he wants to check his account balance and increase his credit card limit, which is transmitted to and received at the authentication management system 320 (block 104). The authentication management system 320 determines that the user needs level two authentication because the account balance requires level one authentication and increasing his credit card limit requires level two authentication (block 106). Authentication management system 320 then determines that the user has only level one authentication, which is less than the level two authentication needed (block 108). The user then receives a notification that additional authentication is needed and is asked to provide additional authentication in the form of a credit card either by photo authentication or NFC authentication (block 110). The user then taps his credit card to his phone, which sends the information to authentication management system 320, which is unable to authenticate the card using NFC authentication (block 112). Authentication management system 320 then determines that since the NFC authentication failed, the user still only has level one authentication and needs to provide further authentication (block 114). Authentication management system 320 determines that there has only been one additional attempt to provide additional authentication (block 130) and transmits a message to the user to submit additional authentication again (block 110). This time, the user selects photo identification and submits a photo of the front and back of his credit card, which is then sent to authentication management system 320, which analyzes the card using OCR and determines that the card is authentic and raises the user's authentication level to two (block 112). Authentication management system 320 then determines that the user has sufficient identification to begin the call (block 114) and transmits a message to the user with a button to start VOIP call to the call center (block 116). When the user selects the button and starts the call, a token is sent to the call center indicating that the user is authenticated (block 118).

In some examples, disclosed systems or methods may involve one or more of the following clauses:

Clause 1: A system for authenticating a user comprising: one or more processors; and memory in communication with the one or more processors and storing instructions that, when executed by the one or more processors, are configured to cause the system to: receive, from a user device, authentication credentials; receive a task request from the user; determine a level of authentication required based on the task request; determine whether a current level of authentication is equal to or greater than the level of authentication required; responsive to determining that the level of authentication required is not equal to or greater than the current level of authentication, iteratively perform the following steps until the system determines the current level of authentication is equal to or greater than the level of authentication required: transmit, to the user device, a first prompt for receiving additional authentication from the user; receive, via the user device, an additional authentication from the user; determine, using the additional authentication, whether the current level of authentication is greater than or equal to the level of authentication required; responsive to determining the current level of authentication is equal to or greater than the level of authentication required: transmit, to the user device, a first message to call a call center as an authenticated user; and transmit, to the call center, a second message that the user is authenticated.

Clause 2: The system of clause 1, wherein transmit the first message further comprises: a second prompt to the user device to start a call using voice over IP (VOIP) to the call center.

Clause 3: The system of clause 1, wherein the authentication credentials are one or more of a username and password, a fingerprint scan, a face scan, or combinations thereof.

Clause 4: The system of clause 1, wherein the additional authentication from the user further comprises: receiving, from the user device, an image of a card of the user; processing, using optical character recognition, the image of the card; authenticating the card; and increasing the current level of authentication.

Clause 5: The system of clause 1, wherein the additional authentication from the user further comprises: receiving, from the user device, identification data associated with a card of the user; authenticating the card; and increasing the current level of authentication.

Clause 6: The system of clause 1, wherein responsive to determining that the current level of authentication is not higher than the level of authentication required, displaying, on the user device, a message indicating that the user may need to prepare items for additional authentication.

Clause 7: The system of clause 6, further comprising transmitting to the call center that the current level of authentication is lower than the level of authentication required.

Clause 8: A system for authenticating a user comprising: one or more processors; and memory in communication with the one or more processors and storing instructions that, when executed by the one or more processors, are configured to cause the system to: receive, from a user device, authentication credentials; transmit, to the user device, a prompt for receiving card authentication from the user; receive, via the user device, a card authentication from the user; determine, using the authentication credentials and the card authentication, an authentication status of the user; transmit a first prompt to the user device to start a call to a call center, from the user device, using an external calling application; verify, using call history on the user device, that a prior call was not previously placed to the call center; and responsive to verifying that the prior call was not previously placed: transmit, to the call center, the authentication status of the user.

Clause 9: The system of clause 8, wherein the authentication status of the user indicates a current level of authentication of the user.

Clause 10: The system of clause 9, wherein the authentication status of the user indicates that a level of authentication required is lower than the current level of authentication.

Clause 11: The system of clause 9, further comprising: determining that the prior call was previously placed to the call center; and transmitting, to the call center, that the user is not authenticated.

Clause 12: The system of clause 11, further comprising: measuring an amount of time since determining the current level of authentication; determining that the amount of time is above a predetermined threshold; and responsive to determining that the amount of time is above the predetermined threshold: transmitting, to the call center, that the user is not authenticated.

Clause 13: The system of clause 9, wherein the card authentication from the user further comprises: receiving, from the user device, an image of a card of the user; processing, using optical character recognition, the image of the card; authenticating the card; and increasing the current level of authentication.

Clause 14: The system of clause 9, wherein the card authentication from the user further comprises: receiving, from the user device, identification data associated with a card of the user; authenticating the card; and increasing the current level of authentication.

Clause 15: The system of clause 8, further comprising: receiving a task request from the user; determining a level of authentication required based on the task request; and transmitting the level of authentication required to the call center.

Clause 16: A system for authenticating a user comprising: one or more processors; and memory in communication with the one or more processors and storing instructions that, when executed by the one or more processors, are configured to cause the system to: receive, from a call center, an indication that a call from the user to the call center has started; determine a level of authentication required based on the indication; transmit a first message, to a user device, to authenticate using a user device application; receive, from the user device, authentication credentials; determine whether a current level of authentication is equal to or greater than level of authentication required; responsive to determining that the level of authentication required is not equal to or greater than the current level of authentication, iteratively perform the following steps until the system determines the current level of authentication is equal to or greater than the level of authentication required: transmit, to the user device, a prompt for receiving additional authentication from the user; receive, via the user device, an additional authentication from the user; determine, using the additional authentication, whether the current level of authentication is greater than or equal to the level of authentication required; and responsive to determining the current level of authentication is equal to or greater than the level of authentication required: transmit, to the call center, a second message that the user is authenticated.

Clause 17: The system of clause 16, wherein the additional authentication further comprises: receiving, from the user device, an image of a card of the user; processing, using optical character recognition, the image of the card; authenticating the card; and increasing the current level of authentication.

Clause 18: The system of clause 16, wherein the additional authentication further comprises: receiving, from the user device, identification data associated with a card of the user; authenticating the card; and increasing the current level of authentication.

Clause 19: The system of clause 16, wherein responsive to determining the current level of authentication is equal to or greater than the level of authentication required further comprises: displaying, via a graphical user interface on the user device application, a message to the user indicating the user has been authenticated.

Clause 20: The system of clause 16, wherein transmitting the first message to authenticate further comprises the level of authentication required.

Clause 21: A system for authenticating a user comprising: one or more processors; and memory in communication with the one or more processors and storing instructions that, when executed by the one or more processors, are configured to cause the system to: receive, from the user, authentication credentials; receive a task request from the user; determine a level of authentication required based on the task request; determine whether a current level of authentication is equal to or greater than the level of authentication required; responsive to determining that the level of authentication required is not equal to or greater than the current level of authentication, iteratively perform the following steps until the system determines the current level of authentication is equal to or greater than the level of authentication required: display, on a graphical user interface, a first prompt for receiving additional authentication from the user; receive an additional authentication from the user; determine, using the additional authentication, whether the current level of authentication is greater than or equal to the level of authentication required; responsive to determining the current level of authentication is equal to or greater than the level of authentication required: display, on the graphical user interface, a second prompt to call a call center as an authenticated user; and transmit, the call center, a first message that the user is authenticated.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for authenticating a user comprising:
   one or more processors; and memory in communication with the one or more processors and storing instructions that, when executed by the one or more processors, are configured to cause the system to:
receive, from a user device, authentication credentials;
receive a task request from the user;
determine a level of authentication required based on the task request;
determine whether a current level of authentication is equal to or greater than the level of authentication required;
responsive to determining that the current level of authentication is not equal to or greater than the level of authentication required, iteratively perform the following steps until the system determines the current level of authentication is equal to or greater than the level of authentication required:
transmit, to the user device, a first prompt for receiving additional authentication from the user;
receive, via the user device, an additional authentication from the user;
determine, using the additional authentication, whether the current level of authentication is greater than or equal to the level of authentication required;
responsive to determining that the current level of authentication is equal to or greater than the level of authentication required:
transmit, to the user device, a first message to call a call center as an authenticated user; and
transmit, to the call center, a second message that the user is authenticated.

2. The system of claim 1, wherein transmit the first message further comprises:
a second prompt to the user device to start a call using voice over IP (VOIP) to the call center.

3. The system of claim 1, wherein the authentication credentials are one or more of a username and password, a fingerprint scan, a face scan, or combinations thereof.

4. The system of claim 1, wherein the additional authentication from the user further comprises:
receiving, from the user device, an image of a card of the user;
processing, using optical character recognition, the image of the card;
authenticating the card; and
increasing the current level of authentication.

5. The system of claim 1, wherein the additional authentication from the user further comprises:
receiving, from the user device, identification data associated with a card of the user;
authenticating the card; and
increasing the current level of authentication.

6. The system of claim 1, wherein responsive to determining that the current level of authentication is not higher than the level of authentication required, displaying, on the user device, a message indicating that the user may need to prepare items for additional authentication.

7. The system of claim 6, further comprising transmitting to the call center that the current level of authentication is lower than the level of authentication required.

8. A system for authenticating a user comprising:
one or more processors; and
memory in communication with the one or more processors and storing instructions that, when executed by the one or more processors, are configured to cause the system to:
receive, from a user device, authentication credentials;
transmit, to the user device, a prompt for receiving card authentication from the user;
receive, via the user device, a card authentication from the user;
determine, using the authentication credentials and the card authentication, an authentication status of the user;
transmit a first prompt to the user device to start a call to a call center, from the user device, using an external calling application;
verify, using call history on the user device, that a prior call was not previously placed to the call center; and
responsive to verifying that the prior call was not previously placed:
transmit, to the call center, the authentication status of the user.

9. The system of claim 8, wherein the authentication status of the user indicates a current level of authentication of the user.

10. The system of claim 9, wherein the authentication status of the user indicates that a level of authentication required is lower than the current level of authentication.

11. The system of claim 9, further comprising:
determining that the prior call was previously placed to the call center; and
transmitting, to the call center, that the user is not authenticated.

12. The system of claim 11, further comprising:
measuring an amount of time since determining the current level of authentication;
determining that the amount of time is above a predetermined threshold; and
responsive to determining that the amount of time is above the predetermined threshold:
transmitting, to the call center, that the user is not authenticated.

13. The system of claim 9, wherein the card authentication from the user further comprises:
receiving, from the user device, an image of a card of the user;
processing, using optical character recognition, the image of the card;
authenticating the card; and
increasing the current level of authentication.

14. The system of claim 9, wherein the card authentication from the user further comprises:
receiving, from the user device, identification data associated with a card of the user;
authenticating the card; and
increasing the current level of authentication.

15. The system of claim 8, further comprising:
receiving a task request from the user;
determining a level of authentication required based on the task request; and
transmitting the level of authentication required to the call center.

16. A system for authenticating a user comprising:
one or more processors; and
memory in communication with the one or more processors and storing instructions that, when executed by the one or more processors, are configured to cause the system to:
receive, from a call center, an indication that a call from the user to the call center has started;
determine a level of authentication required based on the indication;

transmit a first message, to a user device, to authenticate using a user device application;

receive, from the user device, authentication credentials;

determine whether a current level of authentication is equal to or greater than level of authentication required;

responsive to determining that the current level of authentication is not equal to or greater than the level of authentication required, iteratively perform the following steps until the system determines the current level of authentication is equal to or greater than the level of authentication required:

transmit, to the user device, a prompt for receiving additional authentication from the user;

receive, via the user device, an additional authentication from the user;

determine, using the additional authentication, whether the current level of authentication is greater than or equal to the level of authentication required; and responsive to determining that the current level of authentication is equal to or greater than the level of authentication required:

transmit, to the call center, a second message that the user is authenticated.

17. The system of claim 16, wherein the additional authentication further comprises:

receiving, from the user device, an image of a card of the user;

processing, using optical character recognition, the image of the card;

authenticating the card; and increasing the current level of authentication.

18. The system of claim 16, wherein the additional authentication further comprises:

receiving, from the user device, identification data associated with a card of the user;

authenticating the card; and increasing the current level of authentication.

19. The system of claim 16, wherein responsive to determining the current level of authentication is equal to or greater than the level of authentication required further comprises:

displaying, via a graphical user interface on the user device application, a message to the user indicating the user has been authenticated.

20. The system of claim 16, wherein transmitting the first message to authenticate further comprises the level of authentication required.

21. A system for authenticating a user comprising:

one or more processors; and memory in communication with the one or more processors and storing instructions that, when executed by the one or more processors, are configured to cause the system to:

receive, from the user, authentication credentials;

receive a task request from the user;

determine a level of authentication required based on the task request;

determine whether a current level of authentication is equal to or greater than the level of authentication required;

responsive to determining that the current level of authentication is not equal to or greater than the level of authentication required, iteratively perform the following steps until the system determines the current level of authentication is equal to or greater than the level of authentication required:

display, on a graphical user interface, a first prompt for receiving additional authentication from the user;

receive an additional authentication from the user;

determine, using the additional authentication, whether the current level of authentication is greater than or equal to the level of authentication required;

responsive to determining that the current level of authentication is equal to or greater than the level of authentication required:

display, on the graphical user interface, a second prompt to call a call center as an authenticated user; and transmit, the call center, a first message that the user is authenticated.

\* \* \* \* \*